United States Patent
Byun et al.

(10) Patent No.: US 10,172,111 B2
(45) Date of Patent: Jan. 1, 2019

(54) METHOD AND APPARATUS FOR TRANSMITTING CAUSE VALUE RELATED TO SMALL CELL IN WIRELESS COMMUNICATION SYSTEM

(71) Applicant: LG ELECTRONICS INC., Seoul (KR)

(72) Inventors: Daewook Byun, Seoul (KR); Jian Xu, Seoul (KR); Kyungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 15/120,656

(22) PCT Filed: Mar. 18, 2015

(86) PCT No.: PCT/KR2015/002624
§ 371 (c)(1),
(2) Date: Aug. 22, 2016

(87) PCT Pub. No.: WO2015/142051
PCT Pub. Date: Sep. 24, 2015

(65) Prior Publication Data
US 2017/0013591 A1    Jan. 12, 2017

Related U.S. Application Data

(60) Provisional application No. 61/955,166, filed on Mar. 18, 2014.

(51) Int. Cl.
*H04W 68/00* (2009.01)
*H04W 36/00* (2009.01)
(Continued)

(52) U.S. Cl.
CPC ..... *H04W 68/005* (2013.01); *H04W 36/0055* (2013.01); *H04W 16/32* (2013.01); *H04W 84/045* (2013.01); *H04W 92/20* (2013.01)

(58) Field of Classification Search
CPC .................................................. H04W 68/005
See application file for complete search history.

(56) References Cited

U.S. PATENT DOCUMENTS

| 8,249,020 B2* | 8/2012 | Qiu ....................... H04W 36/02 |
| | | 370/252 |
| 9,319,935 B2* | 4/2016 | Fischer ............... H04W 28/065 |

(Continued)

FOREIGN PATENT DOCUMENTS

KR    10-2011-0081661 A    7/2011

OTHER PUBLICATIONS

"3GPP; TSG-RAN; E-UTRAN; X2AP (Release 12)", 3GPP TS 36.423 V12.1.0, Mar. 17, 2014, see pp. 16, 22, 32.
(Continued)

*Primary Examiner* — Andrew Lai
*Assistant Examiner* — Andrew C Lee
(74) *Attorney, Agent, or Firm* — Birch, Stewart, Kolasch & Birch, LLP

(57) ABSTRACT

A method and apparatus for transmitting a cause value related to a small cell in a wireless communication system is provided. An evolved NodeB (eNB) of a small cell receives a request message form a macro cell, and as a response to the request message, transmits to the macro cell a failure message including a cause value related to the small cell. The cause value related to the small cell can indicate the reason why the small cell which is in an "off" state cannot shift to an "on" state, and the failure message can be any one (Continued)

of a handover preparation failure message, a cell activation failure message, or a secondary evolved NodeB (SeNB) addition failure message.

12 Claims, 11 Drawing Sheets

(51) Int. Cl.
    *H04W 92/20*     (2009.01)
    *H04W 84/04*     (2009.01)
    *H04W 16/32*     (2009.01)

(56) References Cited

U.S. PATENT DOCUMENTS

| | | | | |
|---|---|---|---|---|
| 9,668,177 | B2* | 5/2017 | Grob-Lipski | H04W 36/0033 |
| 9,838,920 | B2* | 12/2017 | Wang | H04W 36/0055 |
| 2007/0123257 | A1* | 5/2007 | Noll | H04W 36/0055 455/436 |
| 2009/0061878 | A1* | 3/2009 | Fischer | G08C 17/02 455/436 |
| 2010/0002883 | A1* | 1/2010 | Sammour | H04L 63/1416 380/272 |
| 2010/0173633 | A1* | 7/2010 | Catovic | H04W 76/027 455/436 |
| 2010/0330993 | A1* | 12/2010 | Kone | H04W 36/0055 455/436 |
| 2011/0170466 | A1 | 7/2011 | Kwun | |
| 2011/0250925 | A1* | 10/2011 | Han | H04W 36/0055 455/524 |
| 2012/0135709 | A1* | 5/2012 | Deng | H04W 36/0016 455/411 |
| 2012/0190368 | A1* | 7/2012 | Zhang | H04W 36/0055 455/436 |
| 2012/0315900 | A1* | 12/2012 | Wen | H04W 36/245 455/434 |
| 2013/0053091 | A1* | 2/2013 | Jorguseski | H04W 24/02 455/524 |
| 2013/0070663 | A1* | 3/2013 | Gunnarsson | H04W 36/0083 370/315 |
| 2013/0115959 | A1* | 5/2013 | Amirijoo | H04W 36/0083 455/440 |
| 2013/0182563 | A1* | 7/2013 | Johansson | H04W 76/027 370/228 |
| 2013/0183971 | A1* | 7/2013 | Tamaki | H04W 36/0061 455/436 |
| 2014/0016537 | A1* | 1/2014 | Khobare | H04W 36/30 370/315 |
| 2014/0051446 | A1* | 2/2014 | Rose | H04W 36/165 455/436 |
| 2014/0179325 | A1* | 6/2014 | Xu | H04W 36/0055 455/437 |
| 2014/0200029 | A1* | 7/2014 | Wegmann | H04W 36/0094 455/456.1 |
| 2015/0223121 | A1* | 8/2015 | Keller | H04W 36/0022 370/331 |
| 2015/0350969 | A1* | 12/2015 | Dudda | H04W 36/0005 370/331 |
| 2016/0212790 | A1* | 7/2016 | Fujishiro | H04L 45/24 |

OTHER PUBLICATIONS

Huawei et al., "Small cell on/off transition time reduction", R1-140037, 3GPP TSG RAN WG1 Meeting #76, Prague, Czech Republic, Feb. 10-14, 2014, see p. 2.

LG Electronics, "Small cell addition considering RRC signalling flow", R3-132221, 3GPP TSG-RAN WG3 Meeting #82, San Francisco, USA, Nov. 11-15, 2013, see p. 2.

MediaTek Inc., "On procedure enhancements for small cell fast on/off operation", R1-140244, 3GPP TSG-RAN WG1 #76, Prague, Czech Republic, Feb. 10-14, 2014, see pp. 1, 2.

* cited by examiner

METHOD AND APPARATUS FOR TRANSMITTING CAUSE VALUE RELATED TO SMALL CELL IN WIRELESS COMMUNICATION SYSTEM

CROSS REFERENCE TO RELATED APPLICATIONS

This application is the National Phase of PCT International Application No. PCT/KR2015/002624, filed on Mar. 18, 2015, which claims priority under 35 U.S.C. 119(e) to U.S. Provisional Application No. 61/955,166, filed on Mar. 18, 2014, all of which are hereby expressly incorporated by reference into the present application.

BACKGROUND OF THE INVENTION

Field of the Invention

The present invention relates to wireless communications, and more particularly, to a method and apparatus for transmitting a cause value related to a small cell in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion in 3GPP LTE rel-12, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

Various aspects may be considered for small cell enhancements. In particular, a discovery signal is now under discussion as a technology for dynamically switching on/off a small cell on aspects of physical layer. There may be need for a method of effectively switching on/off a small cell with the discovery signal.

SUMMARY OF THE INVENTION

The present invention provides a method and apparatus for transmitting a cause value related to a small cell in a wireless communication system. The present invention provides a method for indicating a cause value indicating that the small cell cannot be switched on by using a handover procedure, a cell activation procedure and/or a dual connectivity procedure, considering neighbor cells of the small cell.

In an aspect, a method of transmitting a cause value related to a small cell in a wireless communication system is provided. The method includes receiving a request message from a macro cell, and in response to the request message, transmitting a failure message including the cause value related to a small cell to the macro cell.

In another aspect, an evolved NodeB (eNB) of a small cell which is configured to transmit a cause value related to the small cell in a wireless communication system is provided. The eNB includes a radio frequency (RF) unit configured to transmit and receive a wireless signal, and a processor connected to the RF unit, that receives a request message from a macro cell, and, in response to the request message, transmits a failure message including a cause value related to the small cell to the macro cell.

Throughput enhancement and energy saving may be achieved.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
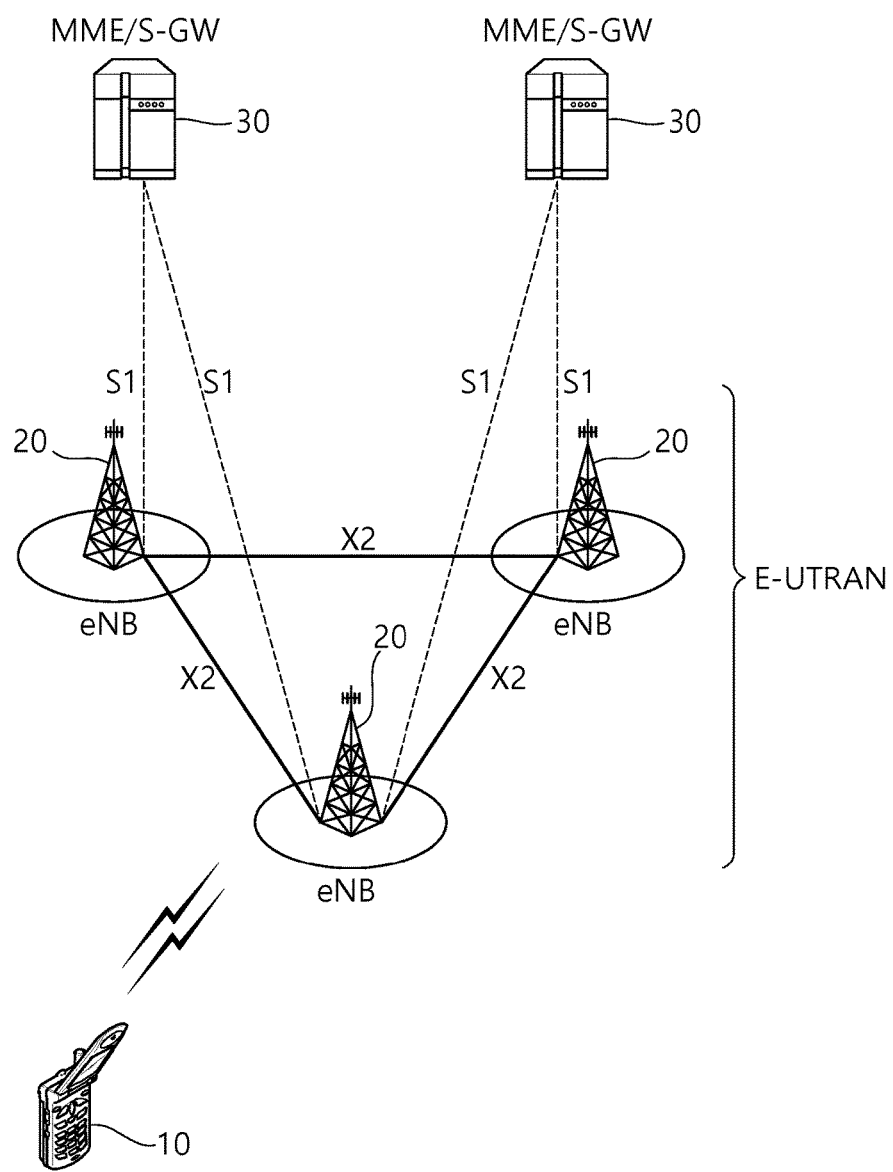
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
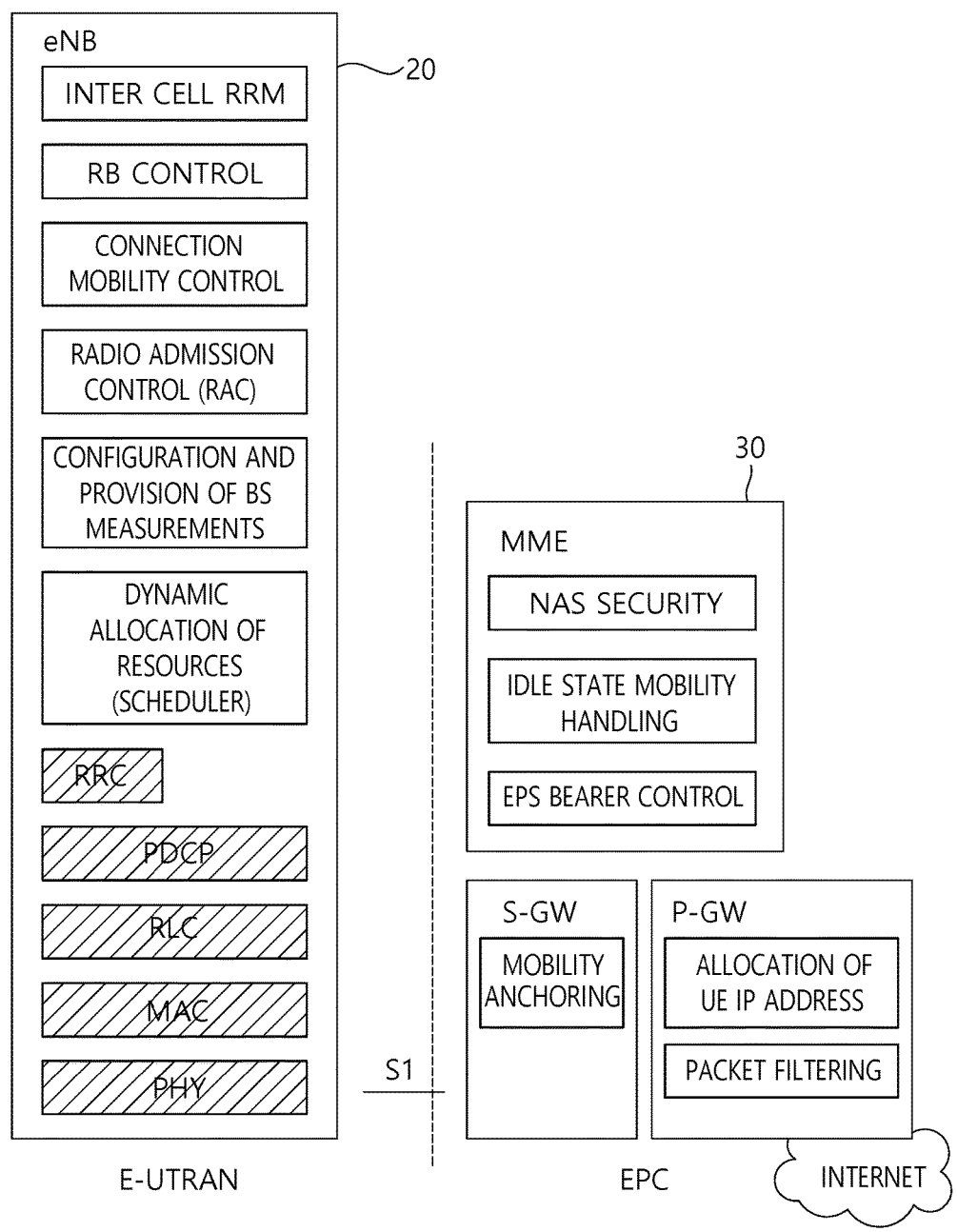
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
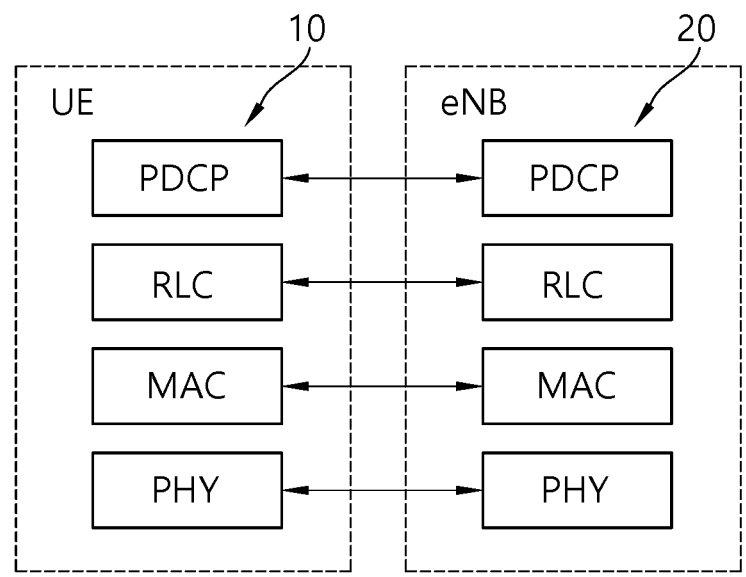
FIG. 3 shows a block diagram of a user plane protocol stack of an LTE system.
Figure 4:
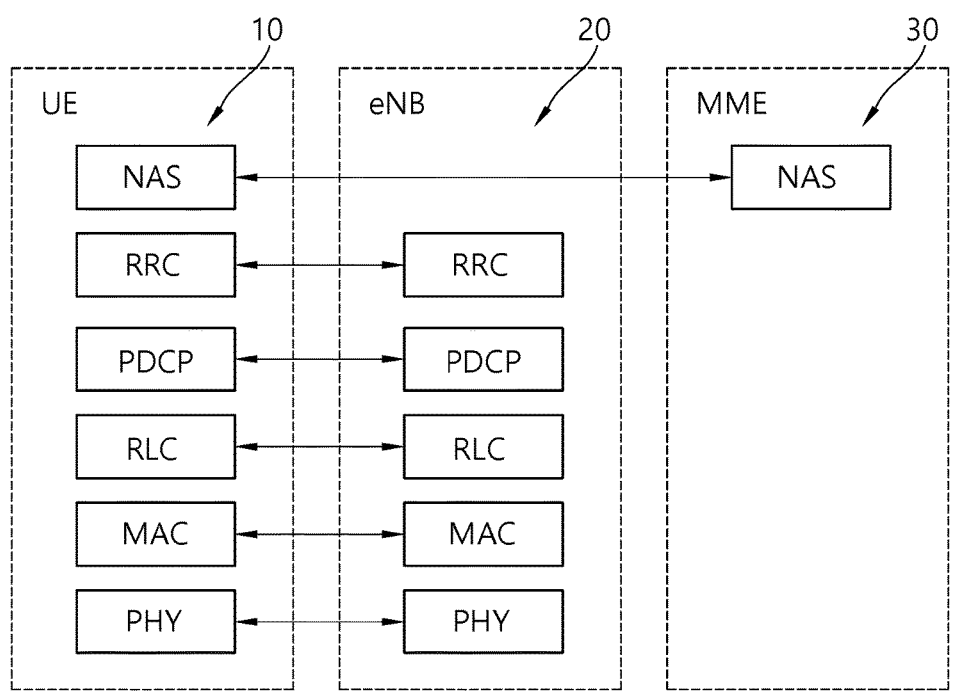
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
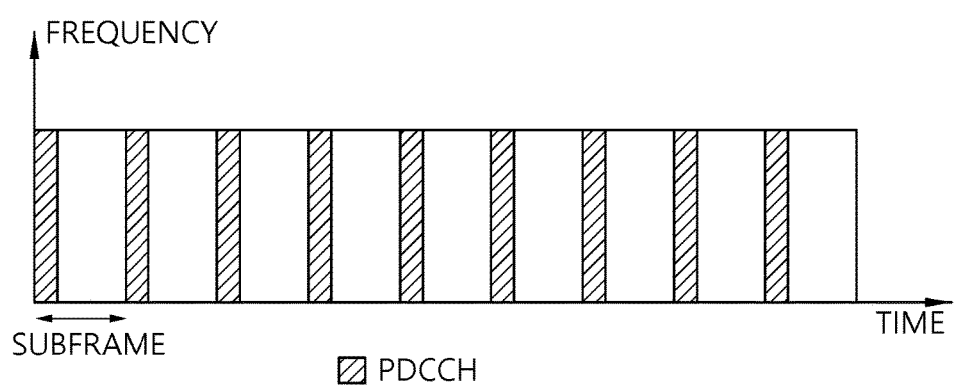
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Figure 6:
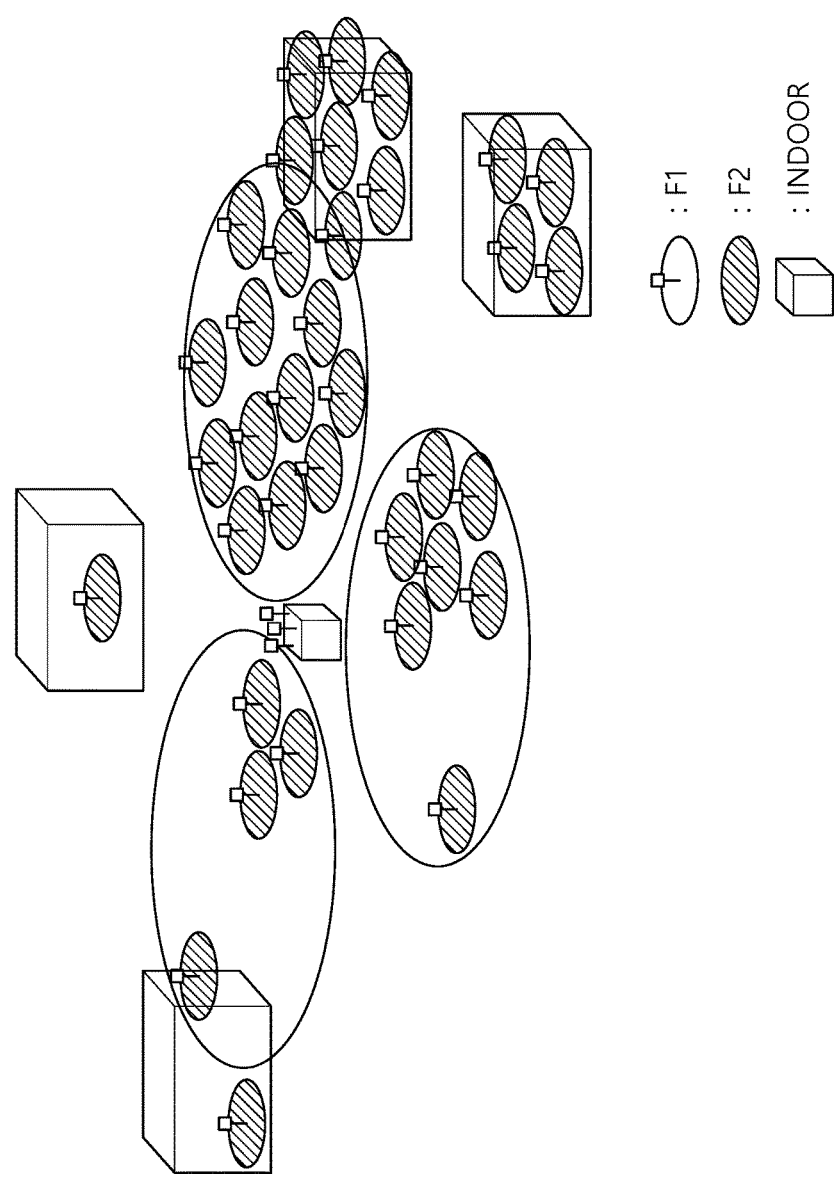
FIG. 6 shows deployment scenarios of small cells with/without macro coverage.

FIG. 6 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered. Referring to FIG. 6, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:
where the UE is in coverage of both the macro cell and the small cell simultaneously where the UE is not in coverage of both the macro cell and the small cell simultaneously.

Also, the deployment scenario where small cell nodes are not deployed under the coverage of one or more overlaid E-UTRAN macro-cell layer(s) may be considered.

For small cell enhancement, discussion is now ongoing on aspects of physical layer. In particular, in order to increase user packet throughput (UPT) of a UE and reduce interruption possibly occurring when every small cell is switched on in a case where a plurality of small cells are deployed in the coverage of a macro cell in 3GPP LTE rel-12, switching on/off a small cell is considered. For the increase in the UPT of the UE, a transit time which is the duration for the small cell to be switched on to off, or vice versa, should be within up to 100 ms.

Various technologies are discussed to support quick transit of the on/off state of a small cell, and one of them is a discovery signal. An off-state small cell transmits a discovery signal to let an UE discover the small cell itself. To enable the UE to receive a data packet which is to be transmitted to the UE when the small cell is switched to on state, the small cell may add, to the discovery signal, information necessary for procedures required to be performed before the small cell is switched to on state, and then transmit the discovery signal. How an off-state small cell transmits a discovery signal, what kind of information that needs to be included in the discovery signal, and/or how an UE measure the discovery signal are still under discussion.

Figure 7:
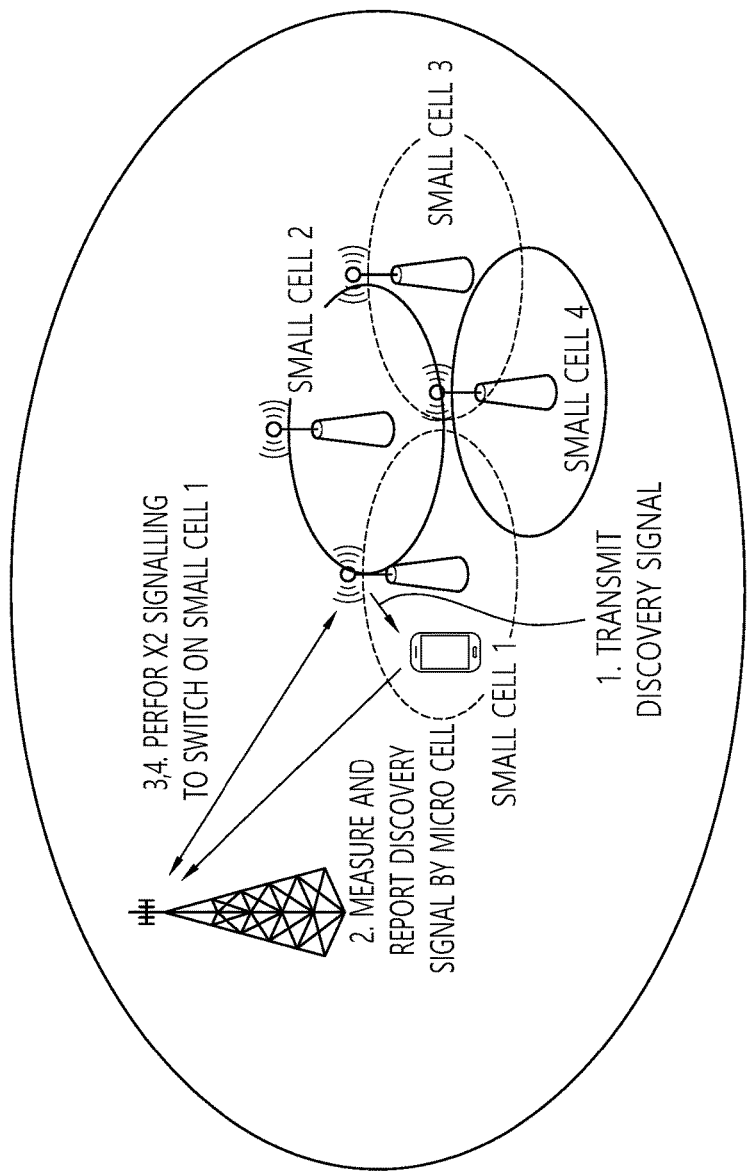
FIG. 7 is an example of how an off-state small cell is switched to on state.

FIG. 7 is an example of how an off-state small cell is switched to on state. In FIG. 7, it is assumed that small cell 1 and small cell 3 are off state, whereas small cell 2 and small cell 4 are on state. In addition, FIG. 7 shows a procedure of how off-state small cell 1 is switched to on state.

1. Off-state small cell 1 periodically transmits a discovery signal.
2. An UE capable of receiving the discovery signal transmitted by off-state small cell 1 measures the discovery signal, and reports the measurement results to a macro cell when a particular condition is satisfied.
3. Upon receiving the report on the discovery signal from the UE, the macro cell asks small cell 1 about the possibility to be switched to on state. The macro cell asks small cell 1, instead of directly switching on small cell 1 by itself based on the report on the discovery signal received from the UE, because the macro cell may be not informed of states of all small cells existing in its coverage.
4. Upon receiving a message from the macro cell, small cell 1 checks whether it is possible to be switched to on state, and notifies the macro cell of the result. That is, even when small cell 1 is capable of being switched to on state based on the measurement on the discovery signal, small cell 1 checks whether it is possible to be switched to on state. It is because small cell 1 determines the possibility of being switched on, by considering the on/off state of adjacent small cells. For instance, when small cells are deployed closely, throughput of an UE may not be enhanced significantly and energy may be wasted.

Table 1 shows exemplary states of small cells 1, 2, and 4, wherein small cells 2 and 4 are adjacent to small cell 1. Small cell 1 checks whether each of small cells 2 and 4 are on/off state, and determines whether it is possible for itself to be switched to on state. That is, when all small cells are on state, interruption may occur and eventually reduce UPT of a UE, and, for this reason, a combination in which only some cells are allowed to be on state may be set. Each small cell may have configuration information on a combination of adjacent small cells.

TABLE 1

| Configuration | State of small cell 1 | State of small cell 2 | State of small cell 4 |
|---|---|---|---|
| 1 | Off | On | Off |
| 2 | Off | On | On |
| 3 | On | Off | On |
| 4 | On | Off | Off |

Referring to Table 1, when small cell 2 is on state and small cell 4 is off state, small cell 1 is not capable of being switched to on state (configuration 1). When both small cells 2 and 4 are on state, small cell 1 is not capable of being switched to on state (configuration 2). When small cell 2 is off state and small cell 4 is on state, small cell 1 is capable of being switched to on state (configuration 3). When both small cells 2 and 4 are off state, small cell 1 is capable of being switched to on state (configuration 4). Referring to FIG. 7, small cell 1 is not capable of being switched to on state because both small cells 2 and 4 are on state.

In procedures 3 and 4 shown in FIG. 7, to enable a macro cell to ask an on-state small cell about the possibility to be switched to on state, and to enable the small cell to determine the possibility and notify the macro cell of a result of the determination, X2 signaling between the macro cell and the small cell is required. For X2 signaling, a handover procedure, a cell activation procedure, a dual connectivity procedure, etc., may be used. In the handover procedure and the cell activation procedure, X2 signaling between a macro cell and a small cell may be performed using previously defined request/response/failure messages. The dual connectivity procedure is still under discussion, and, in the case where a secondary eNB (SeNB) is added, X2 signaling between a macro cell and a small cell may be performed using request/response/failure messages. That is, a macro cell may transmit a request message to an off-state small cell so as to ask the small cell about the possibility to be switched to on state, and the small cell may transmit a response/failure message to the macro cell in response to the request message. When determining that it is possible to be switched to on state, the on-state small cell may transmit a response message to the macro cell. Alternatively, when determining that it is not possible to be switched to on state, the off-state small cell may transmit a failure message to the macro cell.

When the off-state small cell transmits the failure message to notify the macro cell of the fact that the small cell is not capable of being switched to on state, the failure message necessarily includes a cause value. However, there is no defined cause value related to a small cell among various cause values that have been already defined. Therefore, as described above, although a small cell transmits a failure message to notify the macro cell of the fact that the small cell is not capable of being switched to on state due to influence of adjacent small cells, the macro cell may not properly perform operations for controlling the small cell because the macro cell is not informed of an accurate cause value.

Hereinafter, a method of indicating that a small cell is not capable of being switched to on state according to an embodiment of the present invention is described. According to an embodiment of the present invention, when a small cell determines that it is not possible for itself to be switched to on state due to influence of adjacent cells, the small cell may transmit a failure message including a newly defined cause value related to the small cell to a macro cell so as to notify the macro cell.

Figure 8:
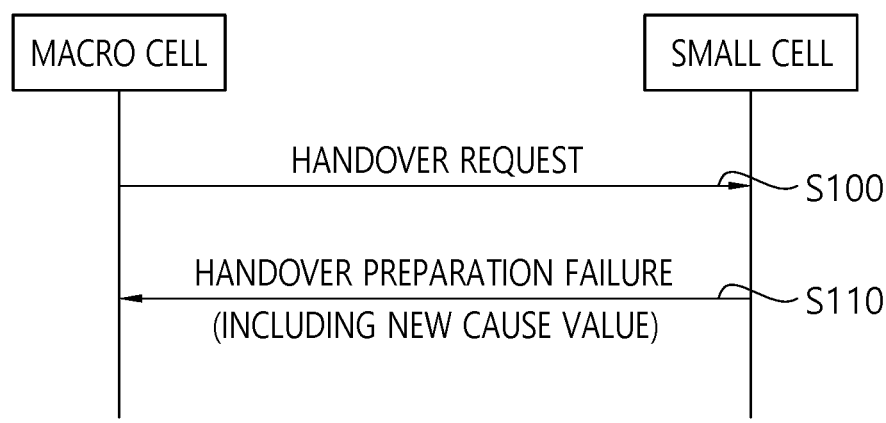
FIG. 8 shows an example of X2 signaling between a macro cell and a small cell according to an embodiment of the present invention.

FIG. 8 shows an example of X2 signaling between a macro cell and a small cell according to an embodiment of the present invention. In step S100, a macro cell transmits a handover request message to a small cell. Using the handover request message, the macro cell may ask the small cell about the possibility to be switched to on state. In step S110, the small cell determines that it is not possible for itself to be switched to on state due to influence of adjacent small cells, and transmits a handover preparation failure message including a newly defined cause value related to the small cell to the macro cell. The cause value related to the small cell indicates a reason that the small cell is not capable of being switched to on state. Accordingly, when receiving the failure message, the macro cell is able to be informed of the exact reason of the failure.

Table 2 shows examples of a Cause information element (IE) including a newly defined cause value related to a small cell. The reason IE is a cause of a specific event for the whole protocol.

TABLE 2

| IE/Group Name | Presence | Range | IE Type and Reference | Semantics Description |
|---|---|---|---|---|
| CHOICE Cause Group | M | | | |
| >Radio Network Layer | | | | |
| >>Radio Network Layer Cause | M | | ENUMERATED (Handover Desirable for Radio Reasons, Time Critical Handover, Resource Optimisation Handover, Reduce Load in Serving Cell, Partial Handover, Unknown New eNB UE X2AP ID, Unknown Old eNB UE X2AP ID, Unknown Pair of UE X2AP ID, HO Target not Allowed, $TX2_{RELOCoverall}$ Expiry, $T_{RELOCprep}$ Expiry, Cell not Available, No Radio Resources Available in Target Cell, Invalid MME Group ID, Unknown MME Code, Encryption And/Or Integrity Protection Algorithms Not Supported, ReportCharacteristicsEmpty, NoReportPeriodicity, ExistingMeasurementID, Unknown eNB Measurement ID, Measurement Temporarily not Available, Unspecified, . . . , Load Balancing, Handover Optimisation, Value out of allowed range, Multiple E-RAB ID instances, Switch Off Ongoing, Not supported QCI value, Switching On not Allowed, Measurement not supported for the object) | |
| >Transport Layer | | | | |
| >>Transport Layer Cause | M | | ENUMERATED (Transport Resource Unavailable, Unspecified, . . . ) | |
| >Protocol | | | | |
| >>Protocol Cause | M | | ENUMERATED (Transfer Syntax Error, Abstract Syntax Error (Reject), Abstract Syntax Error (Ignore and Notify), Message not Compatible with Receiver State, Semantic Error, Unspecified, Abstract Syntax Error (Falsely Constructed Message), . . . ) | |

TABLE 2-continued

| IE/Group Name | Presence | Range | IE Type and Reference | Semantics Description |
|---|---|---|---|---|
| >Misc | | | | |
| >>Miscellaneous Cause | M | | ENUMERATED (Control Processing Overload, Hardware Failure, O&M Intervention, Not enough User Plane Processing Resources, Unspecified, . . . ) | |

Referring to Table 2, Radio Network Layer Cause IE is one of cause values, and includes "Switching On not Allowed" which is a cause value related to a small cell. "Switching On not Allowed" is merely an example of a cause value related to a small cell, and various cause values related to a small cell may be included in Cause IE shown in Table 2. Table 3 provides descriptions about each cause value included in Cause IE shown in FIG. 2.

TABLE 3

| Radio Network Layer cause | Meaning |
|---|---|
| Cell not Available | The concerned cell is not available. |
| Handover Desirable for Radio Reasons | The reason for requesting handover is radio related. |
| Handover Target not Allowed | Handover to the indicated target cell is not allowed for the UE in question |
| Invalid MME Group ID | The target eNB doesn't belong to the same pool area of the source eNB i.e. S1 handovers should be attempted instead. |
| No Radio Resources Available in Target Cell | The target cell doesn't have sufficient radio resources available. |
| Partial Handover | Provides a reason for the handover cancellation. The target eNB did not admit all E-RABs included in the HANDOVER REQUEST and the source eNB estimated service continuity for the UE would be better by not proceeding with handover towards this particular target eNB. |
| Reduce Load in Serving Cell | Load on serving cell needs to be reduced. When applied to handover preparation, it indicates the handover is triggered due to load balancing. |
| Resource Optimisation Handover | The reason for requesting handover is to improve the load distribution with the neighbour cells. |
| Time Critical Handover | handover is requested for time critical reason i.e. this cause value is reserved to represent all critical cases where the connection is likely to be dropped if handover is not performed. |
| $TX2_{RELOCoverall}$ Expiry | The reason for the action is expiry of timer $TX2_{RELOCoverall}$. |
| $T_{RELOCprep}$ Expiry | Handover Preparation procedure is cancelled when timer $T_{RELOCprep}$ expires. |
| Unknown MME Code | The target eNB belongs to the same pool area of the source eNB and recognizes the MME Group ID. However, the MME Code is unknown to the target eNB. |
| Unknown New eNB UE X2AP ID | The action failed because the New eNB UE X2AP ID is unknown. |
| Unknown Old eNB UE X2AP ID | The action failed because the Old eNB UE X2AP ID is unknown. |
| Unknown Pair of UE X2AP ID | The action failed because the pair of UE X2 AP IDs is unknown. |
| Encryption And/Or Integrity Protection Algorithms Not Supported | The target eNB is unable to support any of the encryption and/or integrity protection algorithms supported by the UE. |
| ReportCharacteristicsEmpty | The action failed because there is no characteristic reported. |
| NoReportPeriodicity | The action failed because the periodicity is not defined. |
| ExistingMeasurementID | The action failed because measurement-ID is already used. |
| Unknown eNB Measurement ID | The action failed because some eNB Measurement-ID is unknown. |
| Measurement Temporarily not Available | The eNB can temporarily not provide the requested measurement object. |
| Load Balancing | The reason for mobility settings change is load balancing. |
| Handover Optimisation | The reason for mobility settings change is handover optimisation. |
| Value out of allowed range | The action failed because the proposed Handover Trigger parameter change in the $eNB_2$ Proposed Mobility Parameters IE is too low or too high. |
| Multiple E-RAB ID Instances | The action failed because multiple instances of the same E-RAB had been provided to the eNB. |
| Switch Off Ongoing | The reason for the action is an ongoing switch off i.e. the concerned cell will be switched off after offloading and not be available. It aides the receiving eNB in taking subsequent actions, e.g. selecting the target cell for subsequent handovers. |

TABLE 3-continued

| Radio Network Layer cause | Meaning |
|---|---|
| Not supported QCI value | The action failed because the requested QCI is not supported. |
| Switching On not Allowed | Switching on the indicated cell which is off state is not allowed because adjacent cells are on state. |
| Unspecified | Sent when none of the above cause values applies but still the cause is Radio Network Layer related. |
| Measurement not Supported For The Object | At least one of the concerned cell(s) does not support the requested measurement. |

Referring to Table 3, the cause value "Switch On not Allowed" indicates "Switching on the indicated cell which is off state is not allowed because adjacent cells are on state". In addition, referring to Table 3, existing defined cause values do not include a cause value related to a small cell, specifically, a cause value which indicates that switching on an off-state small cell having received a request message from a macro cell is not allowed because adjacent cells are on state. Meanwhile, in Table 3, the cause value "Cell not Available" indicates "The concerned cell is not available". The fact that the concerned cell is not available means that "the concerned capability is present, but insufficient resources were available to perform the requested action". However, in the present invention, a reason of failure is that a small cell having received a request message from a macro cell is not capable of being switched to on state not because the small cell itself has insufficient resources, but because some of its adjacent small cells are on state. Therefore, if a failure message includes the cause value "Cell not Available", not a newly defined cause value related to the small cell, a macro cell is not able to be informed of the exact reason of the failure, when receiving the failure message from the small cell.

Figure 9:
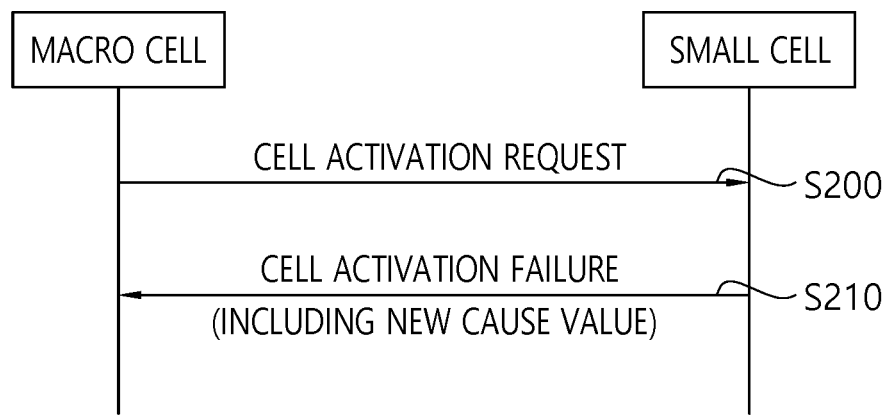
FIG. 9 shows another example of X2 signaling between a macro cell and a small cell according to an embodiment of the present invention.

FIG. 9 shows another example of X2 signaling between a macro cell and a small cell according to an embodiment of the present invention. In step S200, a macro cell transmits a cell activation request message to a small cell. Using the cell activation request message, the macro cell may ask the small cell about the possibility to be switched to on state. In step S210, the small cell determines that it is not possible for itself to be switched to on state due to influence of adjacent small cells, and transmits a cell activation failure message including a newly defined cause value related to the small cell to the macro cell. The cause value related to the small cell indicates a reason that the small cell is not capable of being switched to on state. Accordingly, when receiving the failure message, the macro cell is able to be informed of the exact reason of the failure. The cause value related to the small cell may be referred to Tables 2 and 3.

Figure 10:
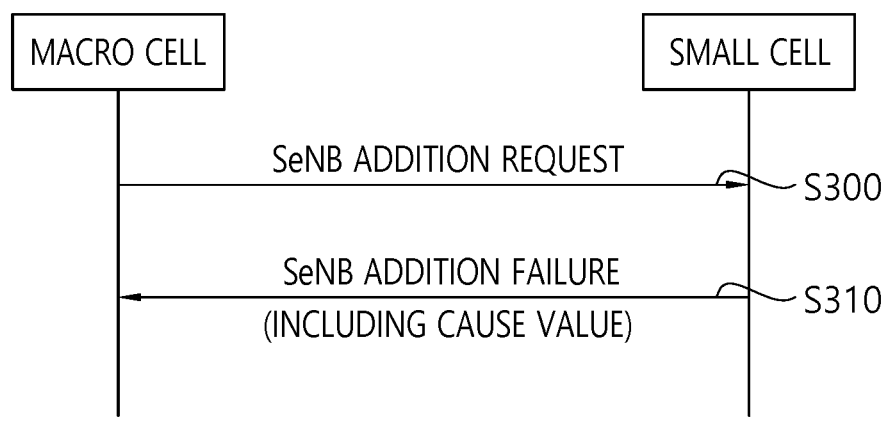
FIG. 10 shows another example of X2 signaling between a macro cell and a small cell according to an embodiment of the present invention.

FIG. 10 shows another example of X2 signaling between a macro cell and a small cell according to an embodiment of the present invention 1. In step S300, a macro cell transmits a SeNB addition request message to a small cell. Using the SeNB addition request message, the macro cell may ask the small cell about the possibility to be switched to on state. In step S310, the small cell determines that it is not possible for itself to be switched to on state due to influence of adjacent cells, and transmits a SeNB addition failure message including a newly defined cause value related to the small cell to the macro cell. The cause value related to the small cell indicates a reason that the small cell is not capable of being switched to on state. Accordingly, when receiving the SeNB addition failure message the macro cell is able to be informed of an exact reason of the failure. The cause value related to the small cell may be referred to Tables 2 and 3.

Figure 11:
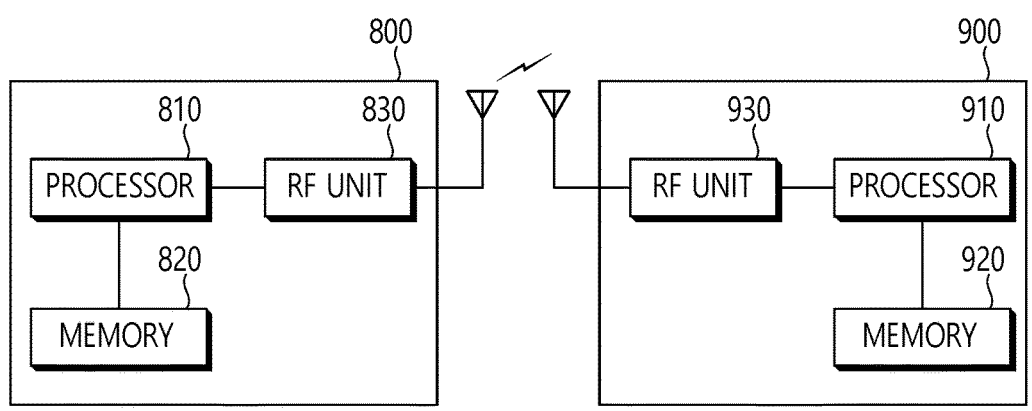
FIG. 11 shows a block diagram of a wireless communication system to implement an embodiment of the present invention.

FIG. 11 shows a block diagram of a wireless communication system to implement an embodiment of the present invention.

An eNB of a macro cell 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An eNB of a small cell 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting failure information in a wireless communication system including a macro eNodeB (MeNB) and a plurality of secondary eNodeBs (SeNBs), the method performed by a specific SeNB among the plurality of SeNBs and comprising:
   receiving, by the specific SeNB from the MeNB, request information; and
   transmitting, by the specific SeNB to the MeNB, the failure information in response to the request information,
   wherein the specific SeNB is in an off-state,
   wherein the failure information includes cause information for failure of switching from the off-state to an on-state, and
   wherein the cause information informs that SeNBs among the plurality of SeNBs neighboring the specific SeNB are in the on-state.

2. The method of claim 1, wherein the cause information is "Switching On not Allowed."

3. The method of claim 1, wherein the request information is handover request information, and the failure information is handover preparation failure information.

4. The method of claim 1, wherein the request information is cell activation request information, and the failure information is cell activation failure information.

5. The method of claim 1, wherein the request information is SeNB addition request information, and the failure information is SeNB addition failure information.

6. The method of claim 1, wherein the MeNB controls a macro cell, and the specific SeNB controls a small cell.

7. A specific secondary eNodeB (SeNB) for transmitting failure information in a wireless communication system including a macro eNodeB (MeNB) and a plurality of SeNBs, the specific SeNB comprising:
   a radio frequency (RF) transceiver that transmits and receives a wireless signal; and
   a processor connected to the RF transceiver,
   wherein the processor is configured to:
   control the RF transceiver to receive, from the MeNB, request information, and
   control the RF transceiver to transmit, to the MeNB, the failure information in response to the request information,
   wherein the specific SeNB is in an off-state,
   wherein the failure information includes cause information for failure of switching from the off-state to an on-state, and
   wherein the cause information informs that SeNBs among the plurality of SeNBs neighboring the specific SeNB are in the on-state.

8. The specific SeNB of claim 7, wherein the cause information is "Switching On not Allowed."

9. The specific SeNB of claim 7, wherein the request information is handover request information, and the failure information is handover preparation failure information.

10. The specific SeNB of claim 7, wherein the request information is cell activation request information, and the failure information is cell activation failure information.

11. The specific SeNB of claim 7, wherein the request information is SeNB addition request evolved and the failure information, information.

12. The specific SeNB of claim 7, wherein the MeNB controls a macro cell, and the specific SeNB controls a small cell.

* * * * *